(12) United States Patent
Kobayashi (10) Patent No.: US 7,988,581 B2
(45) Date of Patent: Aug. 2, 2011

(54) ROTATION OUTPUT DEVICE

(75) Inventor: Harumi Kobayashi, Nagoya (JP)

(73) Assignee: Nabtesco Corporation, Tokyo (JP)

( * ) Notice: Subject to any disclaimer, the term of this patent is extended or adjusted under 35 U.S.C. 154(b) by 407 days.

(21) Appl. No.: 12/226,526

(22) PCT Filed: Apr. 18, 2007

(86) PCT No.: PCT/JP2007/058442
§ 371 (c)(1),
(2), (4) Date: Oct. 21, 2008

(87) PCT Pub. No.: WO2007/125800
PCT Pub. Date: Nov. 8, 2007

(65) Prior Publication Data
US 2009/0062053 A1 Mar. 5, 2009

(30) Foreign Application Priority Data

Apr. 25, 2006 (JP) ................................ 2006-120096

(51) Int. Cl.
*F16H 1/32* (2006.01)
(52) U.S. Cl. ...................................................... 475/162
(58) Field of Classification Search .................. 475/162
See application file for complete search history.

(56) References Cited

U.S. PATENT DOCUMENTS

| 4,003,272 A * | 1/1977 | Volkov et al. .................. 74/640 |
| 4,678,952 A * | 7/1987 | Peterson et al. ................ 310/83 |
| 5,042,322 A * | 8/1991 | Hofmann ........................ 74/640 |
| 6,492,787 B1 | 12/2002 | Hibino et al. |
| 7,056,253 B2 * | 6/2006 | Tsurumi et al. ............... 475/162 |
| 7,409,891 B2 * | 8/2008 | Takemura ....................... 74/640 |
| 7,785,223 B2 * | 8/2010 | Haga et al. .................... 475/162 |
| 2001/0044356 A1 | 11/2001 | Takeuchi et al. |
| 2004/0185981 A1 * | 9/2004 | Tsurumi et al. ............... 475/162 |
| 2008/0305908 A1 * | 12/2008 | Tamenaga ..................... 475/162 |

FOREIGN PATENT DOCUMENTS

JP U-3-65039 6/1991

(Continued)

OTHER PUBLICATIONS

Chinese Office Action issued in Chinese Patent Application No. 200780014659.0 dated Jul. 13, 2010 (with translation).

*Primary Examiner* — Dirk Wright
(74) *Attorney, Agent, or Firm* — Oliff & Berridge, PLC (57) ABSTRACT

A compact rotation output device is realized by disposing an output shaft of a reduction gear transmission coaxially with an axis line of a rotating disk while simultaneously ensuring a space in a rear face of the rotating disk through which a columnar bar or wiring etc. can pass.

A reduction gear transmission is provided with an input shaft having an eccentric rotation member, an external gear that has a through hole at its center and revolves orbitally while engaging with the eccentric rotation member, and an internal gear that surrounds the external gear while meshing with the external gear and allows the orbital revolution of the external gear. The number of teeth of the external gear differs from the number of teeth of the internal gear. The rotating disk is fixed to one of the external gear and the internal gear of the reduction gear transmission. The columnar bar is formed on the rotating disk, this columnar bar rotating together with the rotating disk, passing through the external gear, and extending longer than the input shaft.

5 Claims, 5 Drawing Sheets

FOREIGN PATENT DOCUMENTS

| | | |
|---|---|---|
| JP | A-4-370442 | 12/1992 |
| JP | A-5-13794 | 1/1993 |
| JP | A-8-226498 | 9/1996 |
| JP | A-10-202458 | 8/1998 |
| JP | A-11-347868 | 12/1999 |
| JP | A-2001-99245 | 4/2001 |
| JP | A-2001-323972 | 11/2001 |

* cited by examiner

ROTATION OUTPUT DEVICE

TECHNICAL FIELD

The present application claims priority to Japanese Patent Application No. 2006-120096 filed on Apr. 25, 2006, the contents of which are hereby incorporated by reference into the present specification.

The present invention relates to a rotation output device capable of accurately controlling a rotation angle of a rotating disk.

BACKGROUND ART

A rotation output device has been developed for a device that, for example, rotates an object to be processed in order to make processing thereof easier. This type of rotation output device comprises a rotating disk that fixes the object to be processed, and a reduction gear transmission reduces the speed of rotation of a motor and causes the rotating disk to rotate. An example of a rotation output device is set forth in Japanese Patent Application Publication No. H11-347868 (Patent Document 1). In the rotation output device of Patent Document 1, a reduction gear transmission is attached to an output shaft of a motor, a pinion is fixed to an output shaft of the reduction gear transmission, and the pinion meshes with internal teeth formed on an inner circumference of a rotating disk.

A reduction gear transmission that is capable of realizing a large speed reduction ratio, in which backlash is small, and in which position fixing reproducibility is high is desired. A reduction gear transmission capable of meeting this requirement is set forth in Japanese Examined Patent Application Publication No. H5-13794 (Patent Document 2). The reduction gear transmission of Patent Document 2 comprises a crankshaft, an external gear, and an internal gear. The crankshaft includes an eccentric cam that rotates eccentrically when the crankshaft rotates. The external gear comprises a hole engaging with the eccentric cam, and the external gear revolves orbitally when the eccentric cam rotates eccentrically. The internal gear has a number of teeth differing from the number of teeth of the external gear, surrounds the external gear while meshing with the external gear, and allows the orbital revolution of the external gear.

In this reduction gear transmission, the internal gear rotates when the rotation of the external gear is restricted. Conversely, the external gear revolves orbitally while rotating when the rotation of the internal gear is restricted. This type of reduction gear transmission may be called a reduction gear transmission of an inner meshing planetary gear type.

DISCLOSURE OF INVENTION

Problem to be Solved by the Invention

In the aforementioned type of rotation output device, it is necessary to detect the rotation angle of the rotating disk accurately. In response to this need, a shaft (a columnar bar) that extends from the rotating disk and rotates together with the rotating disk is often required. When the rotating disk is provided with the shaft (the columnar bar) that rotates together with the rotating disk, a rotation angle detecting member can be attached to the columnar bar, thus making it possible to detect the rotation angle of the rotating disk. Alternatively, it may be necessary to connect a hose or a cable to an object attached to the rotating disk, in a manner that this hose or cable is attached from the rotating disk side. In this case, a hole is provided in a center of the rotating disk, and the hose or cable is passed through this hole. In this type of rotation output device, a space is required in an inner surface of the rotating disk to allow the passage of the columnar bar or the hose or cable.

Since the space is required in the inner surface of the rotating disk to allow the passage of the columnar bar or the hose or cable, it is not possible in the conventional rotation output device to dispose the reduction gear transmission coaxially with the rotating disk. The output shaft of the reduction gear transmission extends parallel to an axis line of the rotating disk at a position separated by a distance from this axis line.

The rotation output device cannot have a compact configuration with the layout in which the output shaft of the reduction gear transmission extends parallel to the axis line of the rotating disk at a position separated by a distance from this axis line. If the axis line of the rotating disk and the output shaft of the reduction gear transmission could be disposed coaxially, the space in the inner surface of the rotating disk could be utilized to make the rotation output device more compact. However, with the layout in which the output shaft of the reduction gear transmission is offset from the axis line of the rotating disk, the space at the inner surface of the rotating disk cannot be utilized effectively.

The present invention sets forth a rotation output device having a compact configuration that effectively utilizes space at an rear surface of a rotating disk by means of disposing an output shaft of a reduction gear transmission coaxially with an axis line of the rotating disk while simultaneously ensuring a space in the rear surface of the rotating disk capable of allowing the passage of a columnar bar, a hose or a cable.

Means to Solve the Problem

A rotation output device of the present invention was conceived based on the knowledge that, in an inner meshing planetary gear type reduction gear transmission, a space capable of allowing the passage of a columnar bar, a hose or a cable can be ensured in an rear surface of a rotating disk even if an output shaft of the reduction gear transmission is disposed coaxially with an axis line of the rotating disk. That is, a knowledge that, if inner meshing planetary gear type reduction gear transmission is utilized, the space capable of allowing the passage of a columnar bar, a hose or a cable extending along the axis line of the rotating disk can be ensured, and consequently the space capable of allowing the passage of a columnar bar, a hose or a cable can be ensured in the rear surface of the rotating disk even if the output shaft of the reduction gear transmission is disposed coaxially with the axis line of the rotating disk, is put into full practice.

A rotation output device of the present invention comprises a reduction gear transmission, a rotating disk, and a columnar bar.

The reduction gear transmission comprises an input shaft having an eccentric rotation member that rotates eccentrically together with the rotation of the input shaft, an external gear that has a through hole at its center and revolves orbitally while engaging with the eccentric rotation member, and an internal gear that surrounds the external gear while meshing with the external gear. The internal gear allows the orbital revolution of the external gear, and has a number of teeth differing from the number of teeth of the external gear.

The rotating disk is fixed to one of the external gear and the internal gear.

The columnar bar extends from the rotating disk and passes through the external gear, and extends longer than the input shaft. The columnar bar rotates together with the rotating disk. The columnar bar need not be fixed directly to the rotating disk, and may be fixed to either the external gear or the internal gear to which the rotating disk is fixed.

In the rotation output device, the input shaft of the reduction gear transmission rotates when torque from a motor is applied thereto, whereupon the reduction gear transmission reduces the speed of rotation and causes the rotation of the rotating disk fixed to the external gear or the internal gear.

In the rotation output device of the present invention, a reduction gear transmission comprising an inner meshing planetary gear is utilized. The reduction gear transmission utilizing the inner meshing planetary gear can easily obtain a large speed reduction ratio while being compact. Further, the through hole can be formed in the center of the external gear, and the columnar bar, hose, or cable can be passed through this through hole.

In the rotation output device of the present invention, a gear for transmitting torque between the reduction gear transmission and the rotating disk is not needed. As a result, manufacture of the device is simplified, and the device can be made compact. Further, since an output shaft of the reduction gear transmission and the rotating disk rotate together, backlash between the reduction gear transmission and the rotating disk does not occur. It is possible to accurately control the rotation angle of the rotating disk.

In the rotation output device of the present invention it is preferred that the columnar bar comprises a through hole along its axis line.

With this rotation output device, piping or wiring can pass through the interior of the through hole. Since wiring or the like attached to the object to be processed can pass through the interior of the through hole, it is possible to prevent the wiring or the like from being scattered at the surroundings of the device.

In the rotation output device of the present invention, it is preferred that a length from a surface of the rotating disk to an end of the reduction gear transmission on a side opposite of the rotating disk is longer than a motor length, and further it is preferred that the motor is arranged between surfaces orthogonal to the axis line of the rotating disk; one of which includes the surface of the rotating disk, and another of which orthogonal to the axis line of the rotating disk, and includes the end of the reduction gear transmission on the side opposite to the rotating disk.

According to the above rotation output device, the length along the axis line of the rotation output device is determined by the length of the rotating disk along the axis line and the length of the reduction gear transmission along the axis line. Further, by arranging the motor in the above position, the length along the axis line of the rotation output device can be maintained at the minimum required amount. A compact rotation output device can thus be realized.

In the rotation output device of the present invention it is preferred that the input shaft of the reduction gear transmission is arranged coaxially with the columnar bar at an outer side of the columnar bar.

According to this device, the degree of freedom with respect to the types of motor and the methods of installing the motor can be increased. For example, an output shaft of the motor and the input shaft of the reduction gear transmission can be coupled by a pulley and a belt. The length along the axis line of the rotation output device can thus remain at the minimum required amount. Further, a hollow motor can be fixed to the reduction gear transmission, and the input shaft of the reduction gear transmission can be coupled directly with a rotor of the motor. When the hollow motor is utilized, the radius of the rotation output device can be made closer to the radius of the rotating disk. That is, the length in the radial direction of the rotation output device can be maintained at the minimum required amount.

The input shaft of the reduction gear transmission may be arranged parallel to the columnar bar and at a distance from the axis line of the columnar bar. In this case, any types of measuring devices can be attached to the columnar bar.

It is preferred that a rotation angle detecting member is attached to the columnar bar and detects a rotation angle of the rotating disk, and that a control device controls a motor in accordance with a detecting signal of the rotation angle detecting member.

According to this rotation output device, it is possible to detect and control the rotation angle of the rotating disk. If the rotation angle detecting member were located on the rotating disk, the rotation angle detecting member might accidentally make contact with the object to be processed that is being attached to the rotating disk. However, if the rotation angle detecting member is attached to the columnar bar, this type of problem does not occur.

Effects of the Invention

According to the rotation output device of the present invention, it is possible, by utilizing a reduction gear transmission provided with an inner meshing planetary gear, to dispose the reduction gear transmission coaxially with a rotating disk at a rear surface of this rotating disk. The columnar bar that rotates together with the rotating disk can extend from the rear surface of the rotating disk. The rotation output device can consequently be formed small in its size.

According to the rotation output device of the present invention, an output shaft of the reduction gear transmission and the rotating disk are fixed and rotate together. As a result, backlash between the output shaft of the reduction gear transmission and the rotating disk does not occur. A rotation angle of the rotating disk can consequently be controlled accurately.

According to the rotation output device of claim 2, cable, wiring, or the like connected with a jig or an object to be processed attached to the rotating disk may be made to pass through this rotating disk.

EMBODIMENTS OF THE INVENTION

Some of the features of the present embodiments will be described below.

(Feature 1) A rotating disk may rotate together with a carrier that supports an external gear of a reduction gear transmission.

(Feature 2) A through hole may be formed at a center of the reduction gear transmission.

(Feature 3) A columnar bar may extend from a rear surface of a rotating disk and pass through the through hole of the reduction gear transmission. An encoder that detects a rotation angle of the rotating disk may be attached to the columnar bar.

(Feature 4) The columnar bar may be hollow, and wiring or cable may pass through the interior of the columnar bar.

(Feature 5) Either an external gear or an internal gear of the reduction gear transmission may rotate together with the rotation of an input shaft of the reduction gear transmission. The rotating disk may be fixed to one of the gear that is rotating, i.e. either the external gear or the internal gear.

In the embodiment below, for the sake of clarity in the figures, a part of the hatching representing cross-sections may be omitted.

First Embodiment

Figure 1:
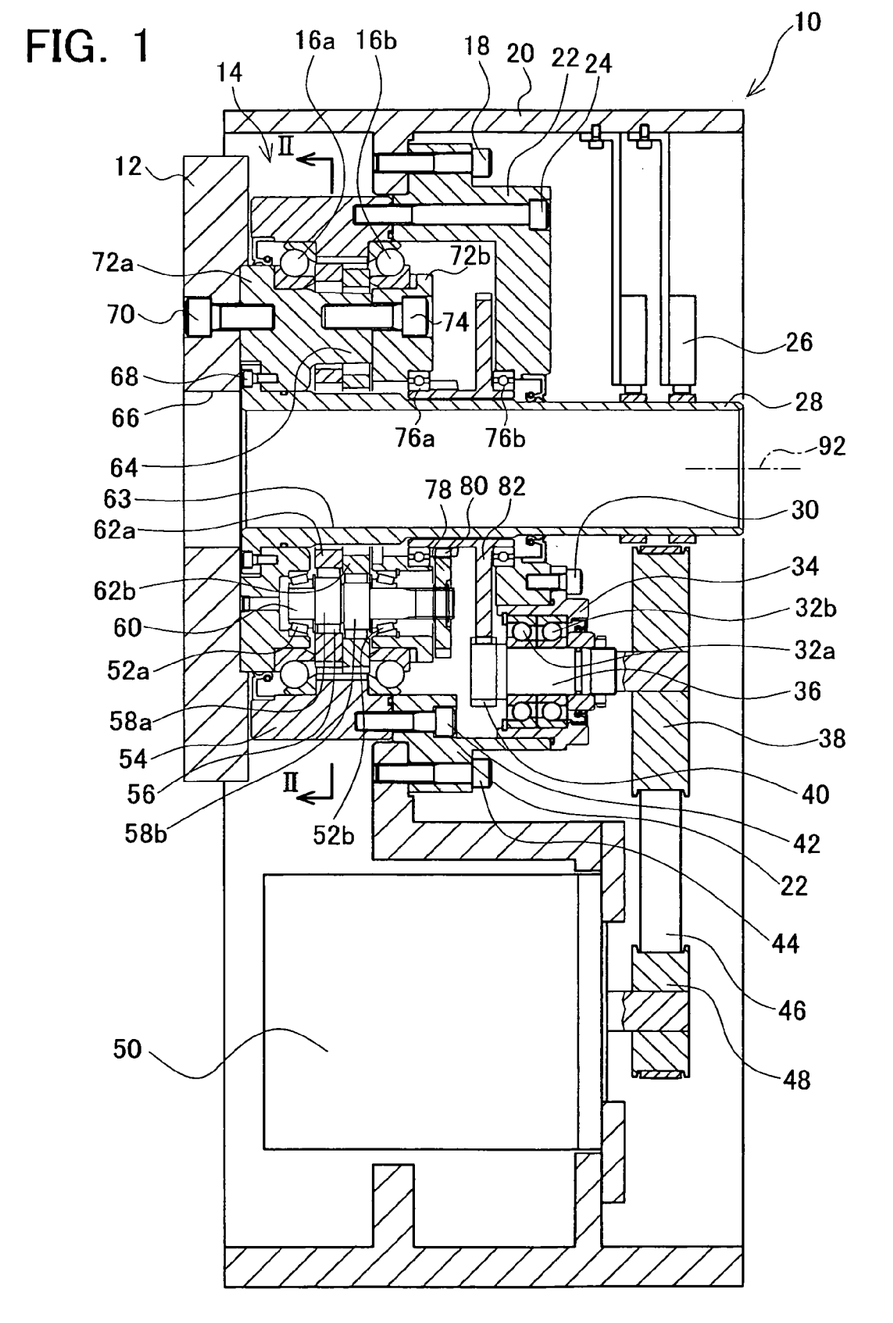
FIG. 1 shows a cross-sectional view of a rotation output device of an Embodiment 1.

FIG. 1 shows a cross-sectional view of essential parts of a rotation output device 10 of the present embodiment.

The rotation output device 10 comprises a rotating disk 12, a reduction gear transmission 14, a columnar bar 28, and a motor 50.

The motor 50 is fixed to a frame 20 by bolts (not shown), and is coupled with an intermediate shaft 36 by a pulley 48, a belt 46, and a pulley 38. The intermediate shaft 36 is supported on a housing 34 by a pair of angular ball bearings 32a and 32b so as to be capable of rotating but incapable of moving in an axis line direction of the intermediate shaft 36. The housing 34 is fixed to a support member 22 by bolts 30, and the support member 22 is fixed to the frame 20. The support member 22 fixes the reduction gear transmission 14. A gear portion 40 is formed at an end portion of the intermediate shaft 36, and the gear portion 40 meshes with a spur gear 82. The spur gear 82 meshes with a spur gear 78 by means of a gear portion 80 formed at a part of the spur gear 82. The spur gear 78 is fixed to an input shaft (a crankshaft) 60 of the reduction gear transmission 14. The spur gear 82 is supported on an immovable portion of the reduction gear transmission 14 by a pair of bearings 76a and 76b so as to be capable of rotating but incapable of moving in an axis line direction of the reduction gear transmission 14. The spur gear 82 does not make contact with the columnar bar 28 (to be described in detail later).

The reduction gear transmission 14 is fixed to the support member 22 by bolts 24 and 42. The support member 22 is fixed to the frame 20 by bolts 18 and 44. The reduction gear transmission 14 will be described in detail later.

The rotating disk 12 is fixed by a bolt 70 to a carrier (this forming an output portion of the reduction gear transmission 14) 72a of the reduction gear transmission 14. A through hole 66 is formed in a central part of the rotating disk 12. The input shaft 60 of the reduction gear transmission 14 extends parallel to an axis line 92 of the rotating disk 12 at a position apart from the axis line 92 of the rotating disk 12 by a predetermined distance. Although this will be explained later with reference to FIG. 2, the reduction gear transmission 14 of the present embodiment has three input shafts.

The columnar bar 28 is fixed to the carrier 72a by bolts 68. A through hole 63 is formed in a central part of the columnar bar 28, this connecting with the through hole 66 of the rotating disk 12. The columnar bar 28 passes through the reduction gear transmission 14, and extends to a part where an encoder 26 for detecting a rotation angle of the rotating disk 12 is located. The encoders 26 are electrically connected with a control device (not shown) that controls the motor 50.

The reduction gear transmission 14 will now be described.

As shown in FIG. 1, the reduction gear transmission 14 comprises the crankshaft 60 in which eccentric cams 58a and 58b are formed, external gears 62a and 62b that revolve orbitally while engaging with the eccentric cams 58a and 58b, and an internal gear 54 that surrounds the external gears 62a and 62b while meshing with the external gears 62a and 62b and allows the orbital revolution of the external gears 62a and 62b. The respective number of teeth of the internal gear 54 differs from the number of teeth of the external gears 62a and 62b. The crankshaft 60 is supported on the carriers 72a and 72b by a pair of tapered roller bearings 52a and 52b so as to be capable of rotating but incapable of moving in an axis line direction of the crankshaft 60. When the crankshaft 60 rotates, the eccentric cams 58a and 58b rotate eccentrically.

The carriers 72a and 72b are fixed by a bolt 74. The carriers 72a and 72b are supported on the internal gear 54 by a pair of angular ball bearings 16a and 16b so as to be capable of rotating but incapable of moving in an axis line direction of the internal gear 54. Further, a column portion 64 of the carrier 72a passes through through holes formed in the external gears 62a and 62b. The carrier 72a is not capable of rotating with respect to the external gears 62a and 62b, and when the external gears 62a and 62b rotate, the carrier 72a also rotates.

Figure 2:
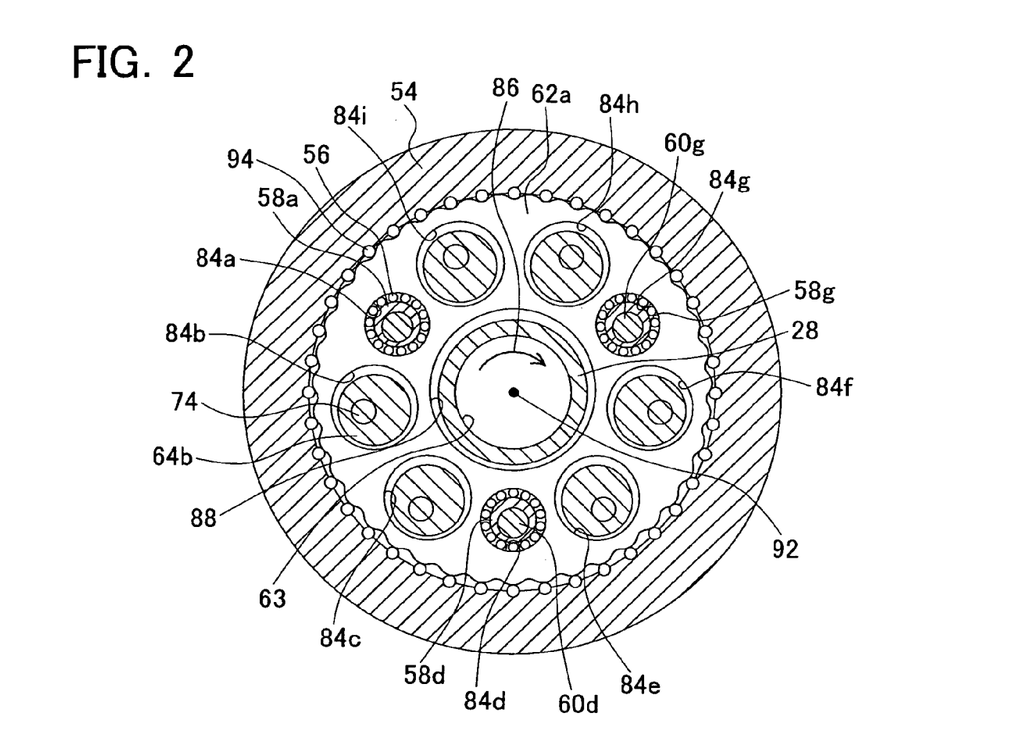
FIG. 2 shows a cross-sectional view along the line II-II of FIG. 1.

FIG. 2 shows a cross-sectional view along the line II-II of the reduction gear transmission 14 in FIG. 1. As shown in FIG. 2, nine holes 84a to 84i are formed along a circumferential direction in the external gear 62a. Six column portions 64b, 64c, 64e, 64f, 64h, and 64i formed in the carrier 72a (in order to simplify the figure, only the column portion 64b has a reference number applied thereto, and the reference numbers of the remaining column portions have been omitted) are inserted into the corresponding holes 84b, 84c, 84e, 84f, 84h, and 84i of the external gear 62a.

Figure 3:
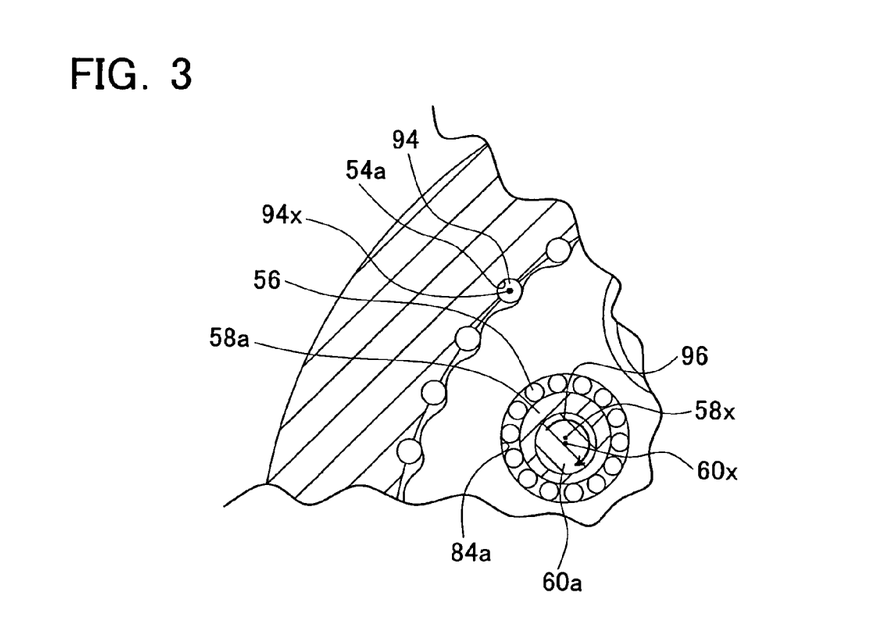
FIG. 3 shows a partially enlarged view of FIG. 2.

FIG. 3 shows a partial enlarged view of an area near the hole 84a of FIG. 2. reference numeral 58a in the figure shows the eccentric cam formed in the crankshaft 60a. The contour of the eccentric cam 58a is round, and a center 58x of the eccentric cam 58a is offset from an axis line 60x of rotation of the crankshaft 60a. The eccentric cam 58a engages with the hole 84a of the external gear 62a via a needle shaft bearing 56. When the crankshaft 60a rotates around the axis line 60x, the center 58x of the eccentric cam 58a revolves orbitally around the axis line 60x of the crankshaft 60a as shown by the arrow 96. When the center 58x of the eccentric cam 58a revolves orbitally as shown by the arrow 96, the external gear 62a revolves orbitally as shown by the arrow 86 (see FIG. 2). The orbital revolution radius of the arrows 86 and 96 are shown as markedly larger than they are in reality, and the actual radius is identical to the offset distance between the center 58x of the eccentric cam 58a and the center 60x of the crankshaft 60a.

reference numbers 58d and 58g (see FIG. 2) refer to eccentric cams, and since the operation and effects thereof are the same as those of the eccentric cam 58a, an explanation thereof is omitted. Moreover, the crankshaft 60a and the eccentric cam 58a are an integral member, but have been shaded with separate diagonal lines in order to make them easily distinguishable. This is also the case for a crankshaft 60d and the eccentric cam 58d, and for a crankshaft 60g and the eccentric cam 58g.

The external gear 62a has thirty-nine teeth, and the internal gear 54 has forty teeth. That is, the number of teeth of the external gear 62a is one less than the number of teeth of the internal gear 54. When external teeth of a portion in the circumferential direction of the external gear 62a are in a meshed state with some of the internal pins 94 in the circumferential direction of the internal gear 54, the external gear 62a is capable of orbital revolution around the axis line 92 of the internal gear 54 as shown by the arrow 86. The internal pins 94 are not fixed to the internal gear 54, but are disposed in a groove 54a (see FIG. 3) formed in the internal gear 54. The internal pins 94 are capable of rotating around its center 94x. This is the case for all forty pieces of internal pins 94.

A space allowing the orbital revolution 86 of the external gear 62a is maintained between the hole 84b of the external gear 62a and the column portion 64b. In the present embodiment, the internal gear 54 is prevented from rotating by being fixed to the frame 20 (see FIG. 1), and consequently when the crankshaft 60a rotates, the external gear 62a rotates while revolving orbitally around the axis line 92. At this juncture, the carriers 72a and 72b also rotate in accordance with the rotation of the external gear 62a. Since the number of teeth of the external gear 62a is one less than the number of teeth of the internal gear 54, the number of teeth of the internal gear 54 being 40, the external gear 62a makes one rotation for every 40 orbital revolutions of the external gear 62a. That is, the external gear 62a makes one rotation for every 40 rotations of the crankshaft 60a.

A hole 88 is formed in a central part of the external gear 62a, and the columnar bar 28 passes through the interior of the hole 88. A through hole 63 is formed in the interior of the columnar bar 28, and cable, wiring, etc. can pass through the interior of the through hole 63.

The above description is the same for the external gear 62b, except that the direction of being offset is the opposite direction. In the state of FIG. 2 and FIG. 3, the center 58x of the eccentric cam 58a for the external gear 62a is offset upwards, relative to the page, from the axis line 60x of rotation of the crankshaft 60a. The center 58x of the eccentric cam 58a for the external gear 62a, and a center of the eccentric cam 58b for the external gear 62b are always in a symmetrical position in which the axis line 60x of rotation of the crankshaft 60a is between the two. That is, in FIG. 2, if the external gear 62a is offset in the left direction, then the external gear 62b is offset in the right direction; if the external gear 62a is offset in the upward direction, then the external gear 62b is offset in the downward direction; if the external gear 62a is offset in the right direction, then the external gear 62b is offset in the left direction; and if the external gear 62a is offset in the downward direction, then the external gear 62b is offset in the upward direction. That is, if the entirety of the external gear 62a, the external gear 62b, and the crankshaft 60a are observed, the external gear 62a and the external gear 62b are arranged symmetrically with respect to the axis line 60x of rotation of the crankshaft 60a; and a relationship in which rotational balance is maintained is hence realized.

The operation of the rotation output device 10 of the present embodiment will now be described. In the rotation output device 10, the torque of the motor 50 is transmitted to the intermediate shaft 36 by the belt 46 coupling the pulleys 38 and 48. The rotation of the intermediate shaft 36 is transmitted to the spur gear 82 meshing with the gear portion 40 of the intermediate shaft 36. Then, this rotation is transmitted to the crankshaft 60 via the spur gear 78 that is meshing with the gear portion 80 formed at a part of the spur gear 82. At this juncture, the torque of the motor 50 is transmitted to all the crankshafts 60a, 60d, and 60g via the spur gears 82 and 78. The crankshaft 60a rotates around the axis line 60x (see FIG. 3), whereupon the eccentric cams 58a and 58b are each made to revolve orbitally around the axis line 60x. This is identical for the crankshafts 60d and 60g. When the eccentric cams 58a and 58b revolve orbitally, the external gears 62a and 62b revolve orbitally as shown by the arrow 86 while in a meshed state with the internal gear 54 via the internal pins 94. The internal gear 54 is fixed to the support member 22 by the bolts 24 and 42. That is, the rotation of the internal gear 54 is prevented, while the rotation of the external gears 62a and 62b is permitted. When the external gears 62a and 62b revolve orbitally while in a meshed state with the internal gear 54, the external gears 62a and 62b rotate. When the external gears 62a and 62b rotate, the carriers 72a and 72b rotate in accordance with the rotation of the external gears 62a and 62b, and the rotating disk 12 that is fixed to the carriers 72a and 72b by the bolt 70 consequently rotates around the axis line 92.

The direction of rotation and the rotation angle of the columnar bar 28 are detected by the encoder 26. That is, the direction of rotation and the rotation angle of the rotating disk 12 can be detected. The encoder 26 is electrically connected with a control device (not shown), and detects signals of the encoder 26 are input to the control device. The control device is capable of controlling the direction of rotation and the speed of rotation of the motor 50 in accordance with a program that has been previously set in the control device.

Second Embodiment

Figure 4:
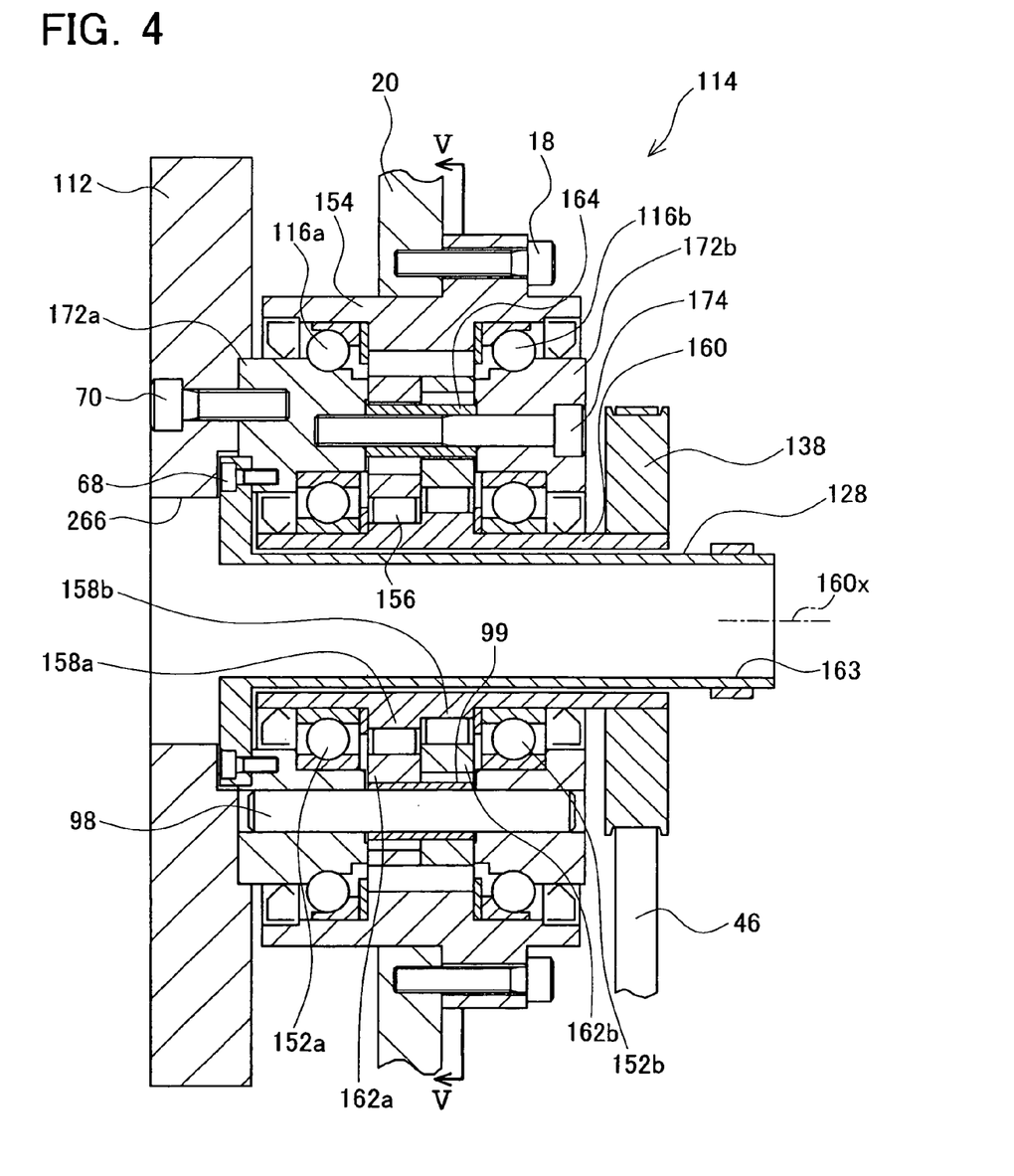
FIG. 4 shows a cross-sectional view of a rotation output device of an Embodiment 2.

A reduction gear transmission utilized in a rotation output device of the present invention may have a columnar bar passing therethrough, or may utilize a reduction gear transmission 114 as shown in FIG. 4. FIG. 4 shows a cross-sectional view of essential parts of the reduction gear transmission 114 and a rotating disk 112 of the present embodiment. Since the configuration of the entire rotation output device is the same as in the first embodiment, a description thereof is omitted. Here, only the features of the reduction gear transmission 114 differing from the first embodiment will be mainly described. Components that are the same as in the first embodiment have the same reference numbers applied thereto, or have reference numbers applied thereto in which the last two digits are identical, and a description thereof is omitted.

A motor (not shown) is coupled with an input shaft (crankshaft) 160 of the reduction gear transmission 114 by the belt 46 and a pulley 138. The input shaft 160 is supported on carriers 172a and 172b by a pair of bearings 152a and 152b so as to be capable of rotating but incapable of moving in an axis line direction of the input shaft 160. Eccentric cams 158a and 158b are formed in an intermediate part in the axis line direction of the input shaft 160. External gears 162a and 162b are formed in a state surrounding the eccentric cams 158a and 158b. An internal gear 154 is formed in a state surrounding the external gears 162a and 162b while meshing with the external gears 162a and 162b. The carriers 172a and 172b are fixed by a bolt 174 via a column shaped member 164. Further, an inner pin 98 passes through holes formed in the external gears 162a and 162b. A part of the carriers 172a and 172b is fixed by the inner pin 98.

An axis line 160x of the input shaft 160 of the reduction gear transmission 114 is identical with an axis line of the rotating disk 112.

Figure 5:
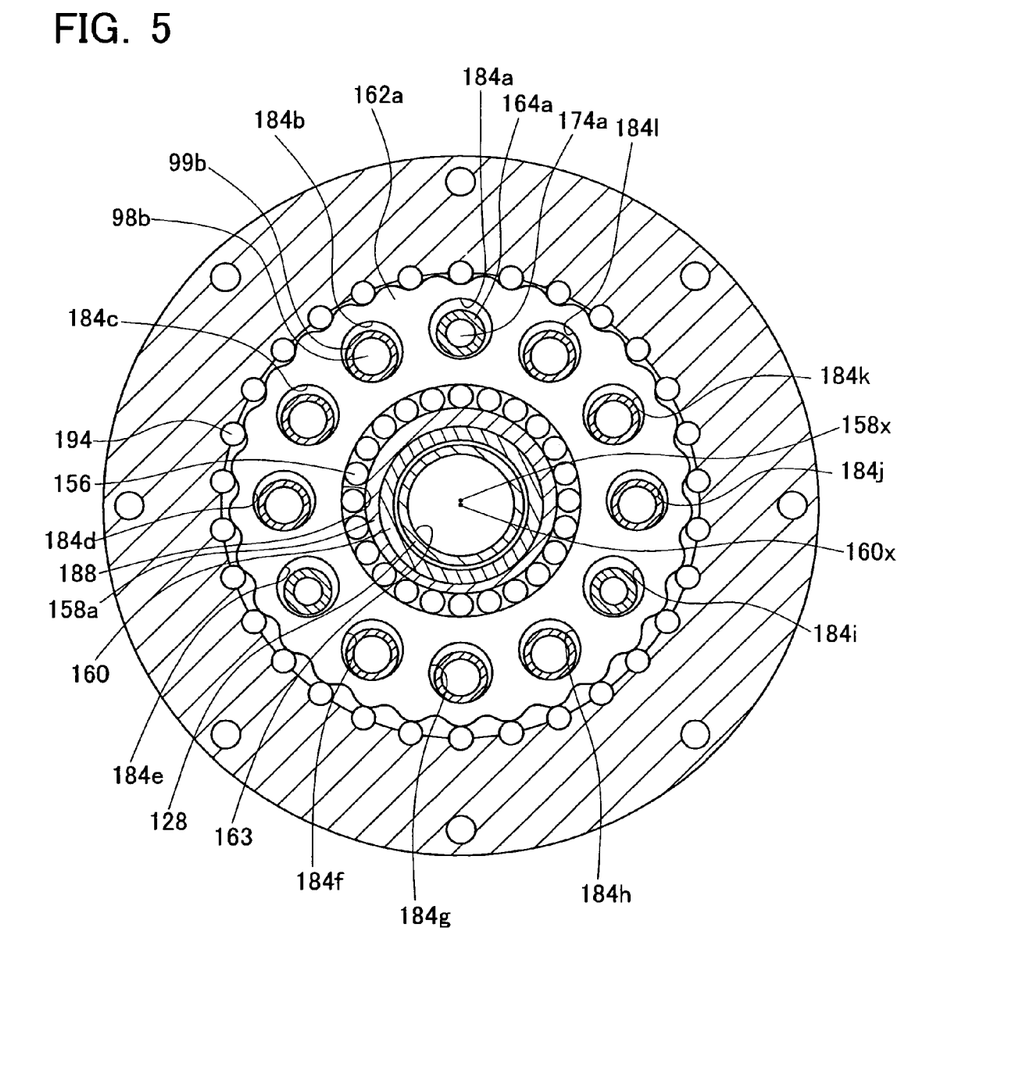
FIG. 5 shows a cross-sectional view along the line V-V of FIG. 4.

FIG. 5 shows a cross-sectional view of the reduction gear transmission 114 along the line V-V of FIG. 4. As shown in FIG. 5, a hole 188 is formed in a central part of the external gear 162a. The eccentric cam 158a of the input shaft 160 engages with the interior of the hole 188 via a needle shaft bearing 156. Moreover, the input shaft 160 and the eccentric cam 158a are an integral member, but have been shaded with separate diagonal lines in order to make them easily distinguishable.

A center 158x of the eccentric cam 158a is offset from the axis line 160x of the input shaft 160. A through hole is formed in a central part of the input shaft 160, and a columnar bar 128 passes through an interior of this through hole. Further, a through hole 163 is also formed in a central part of the columnar bar 128.

Twelve holes 184a to 184l are formed along a circumferential direction in the external gear 162a. Three column shaped members 164a, 164e, and 164i that couple the carriers 172a and 172b (in order to simplify the figure, only the column shaped member 164a has a reference number applied thereto, and the reference numbers of the remaining column shaped members have been omitted) are inserted into the corresponding holes 184a, 184e, and 184i of the external gear 162a. Further, an inner pin 98b is inserted via a roller 99b into the interior of the hole 184b. Rollers and inner pins are also inserted into the interior of the holes 184c, 184d, 184f to 184h, and 184j to 184l (in order to simplify the figure, reference numbers have not been applied to these rollers and inner pins) in the same manner as the hole 184h.

In the reduction gear transmission 114, when the input shaft 160 rotates, the center 158x of the eccentric cam 158a revolves orbitally around the axis line 160x of the crankshaft. When the center 158x of the eccentric cam 158a revolves orbitally, the external gear 162a revolves orbitally around the axis line 160x.

In the present embodiment, the internal gear 154 is fixed to the frame 20, and consequently the external gear 162a revolves orbitally while rotating. That is, the carriers 172a and 172b rotate in accordance with the rotation of the external gears 162a and 162b, and the rotating disk 112 that is fixed to the carriers 172a and 172b by the bolt 70 rotates around the axis line 160x.

Third Embodiment

Figure 6:
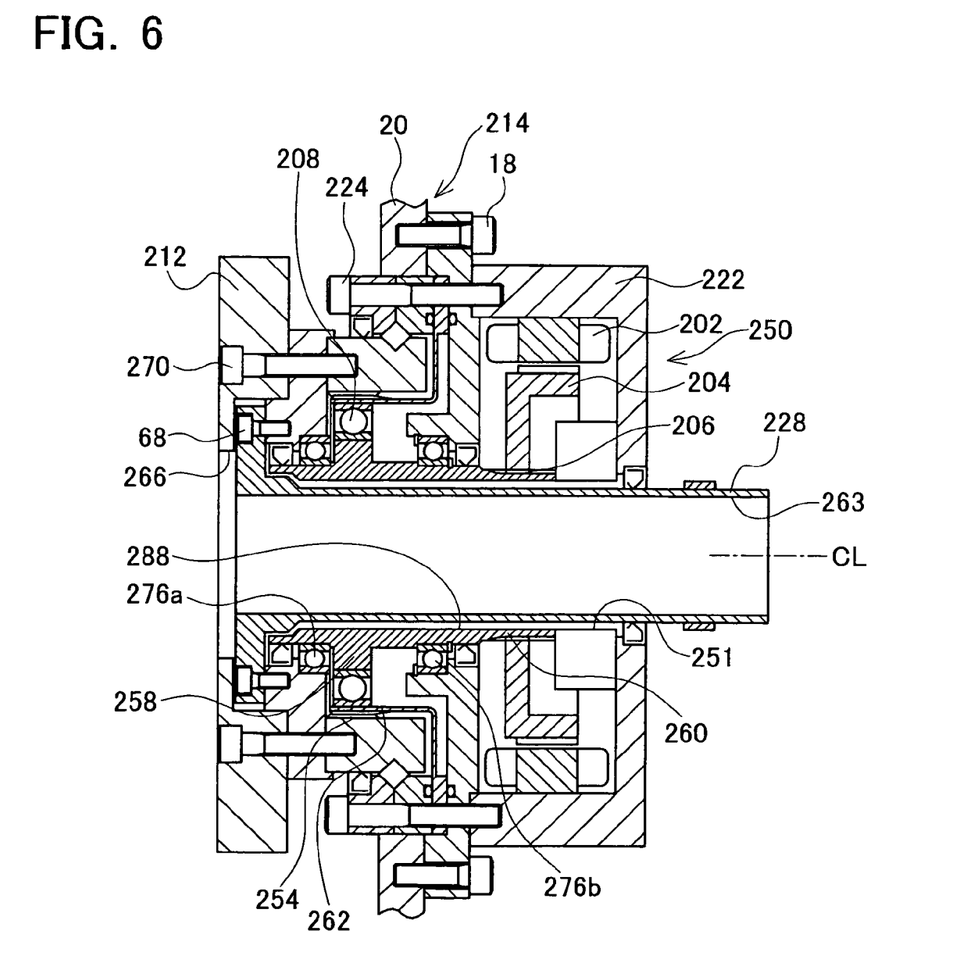
FIG. 6 shows a cross-sectional view of a rotation output device of an Embodiment 3.

In a reduction gear transmission of the type shown in the second embodiment, in which the input shaft of the reduction gear transmission passes through the external gear, the torque of the motor may be transmitted to the input shaft without utilizing a pulley and belt. FIG. 6 shows a cross-sectional view of essential parts of a reduction gear transmission 214, a rotating disk 212, and a motor 250 of a rotation output device of the present embodiment that does not utilize a pulley and belt. Since the configuration of the entire rotation output device is the same as in the first embodiment, a description thereof is omitted. Here, only the features differing from the above embodiments will be mainly described. Components that are the same as in the above embodiments have the same reference numbers applied thereto, or have reference numbers applied thereto in which the last two digits are identical, and a description thereof is omitted.

The motor 250 is fixed to the reduction gear transmission 214 by a bolt 224.

The motor 250 comprises a stator 202, a rotor (rotating body) 204, and a housing 222. The stator 202 is fixed to the housing 222. The motor 250 generates a magnetic field in at least one of the stator 202 and the rotor 204, and is capable of causing the rotor 204 to rotate.

The rotor 204 meshes with a gear portion 206 formed on an end portion of an input shaft 260. An elliptical portion (eccentric rotation member) 258 is formed in the input shaft 260. The elliptical portion 258 has an elliptical or oval shape with an axis line CL of the input shaft 260 as its center, and engages with an external gear 262 via a bearing 208. The external gear 262 has flexible characteristics, and is able to change its shape in accordance with the shape of the elliptical portion 258. As shown in FIG. 6, the external gear 262 meshes with an internal gear 254 at an end portion of a major axis of the elliptical shape of the elliptical portion 258. The external gear 262 does not mesh with the internal gear 254 at an end portion of the elliptical portion 258, which is the other end of the major axis of the elliptical shape. When the input shaft 260 makes one rotation, the external gear 262 rotates with respect to the internal gear 254 in accordance with the difference in number of teeth between the external gear 262 and the internal gear 254. For example, in the case where the external gear 262 has 100 teeth and the internal gear 254 has 102 teeth, when the input shaft 260 makes one rotation, the external gear 262 makes a 1/50 rotation with respect to the internal gear 254. In the present embodiment, the external gear 260 is fixed, and consequently the rotation of the input shaft 260 is output from the internal gear 254.

Further, a through hole 288 is formed in a central part of the input shaft 260 of the reduction gear transmission 214. A through hole 251 is formed in a central part of the motor 250. The through holes 288 and 251 are connected, and a columnar bar 228 extends through the through holes 288 and 251.

In the reduction gear transmission 214, the rotation of the external gear 262 is prevented, and the rotation of the internal gear 254 is permitted. When the input shaft 260 rotates, the internal gear 254 rotates, and the rotating disk 212 that is fixed to the internal gear 254 by bolts 270 consequently rotates around the axis line CL.

In addition, the technological components described in the present specification or drawings exhibit technological utility either individually or in various combinations, and are not limited to the combinations disclosed in the claims at the time of application.

In the above embodiment, the columnar bar is hollow. However, the columnar bar need not necessarily be hollow. In the case where there is no need for wiring, etc. to pass through the interior of the rotation output device, the columnar bar may have a full body. That is, the shape of the columnar bar may be determined in accordance with the purpose and aims of the rotation output device.

E.g. in the second embodiment, the motor and the input shaft of the reduction gear transmission are coupled utilizing the pulley and the belt. However, a motor having a through hole in a central part thereof may be utilized, as in the third embodiment, and the output shaft of the motor may be input directly to the input shaft of the reduction gear transmission.

In the third embodiment, the motor and the input shaft of the reduction gear transmission are coupled directly. However, an output shaft of the motor may be coupled with the input shaft of the reduction gear transmission utilizing a pulley and a belt, as in the first embodiment or the second embodiment.

E.g. in the first embodiment and the second embodiment, the rotation of the input shaft is output utilizing the rotation of the external gear. However, the rotation of the input shaft may be output utilizing the rotation of the internal gear. In this case the external gear may be fixed to the frame, and the internal gear may be fixed to the rotating disk.

In the above embodiments, each of the cases has been given as a mere example where the difference in number of teeth between the external gear and the internal gear is 1 or 2. However, the difference in number of teeth between the external gear and the internal gear may be either 1 or 2, or may be 3 or more. The difference in number of teeth may be determined in accordance with the desired speed reduction ratio.

Furthermore, the technology illustrated in the present specification or the drawings may simultaneously achieve a plurality of objects, and has technological utility by achieving one of those objects.

The invention claimed is:

1. A rotation output device comprising:
    a reduction gear transmission that comprises an input shaft having an eccentric rotation member that rotates eccentrically with the rotation of the input shaft, an external gear that has a through hole at its center and revolves orbitally while engaging with the eccentric rotation member, and an internal gear that surrounds the external gear while meshing with the external gear and allows the orbital revolution of the external gear, the internal gear has a number of teeth differing from the number of teeth of the external gear;
    a rotating disk that is fixed to one of the external gear and the internal gear at one end of the reduction gear transmission in an axial direction of the reduction gear transmission;
    a columnar bar that extends from the rotating disk and passes through the external gear, extends longer than the input shaft, and projects from the other end of the reduction gear transmission, the columnar bar rotates together with the rotating disk; and,
    a rotation angle detecting member that is attached to the columnar bar at outside of the reduction gear transmission and detects a rotation angle of the rotating disk; and
    a control device that controls a motor in accordance with a detecting signal of the rotation angle detecting member; wherein
    the rotating disk rotates with the rotation of the input shaft.

2. The rotation output device according to claim 1, wherein the columnar bar comprises a through hole along its axis line.

3. The rotation output device according to claim 1, wherein a length from a surface of the rotating disk to an end of the reduction gear transmission on a side opposite of the rotating disk is longer than a motor length; and
    the motor is arranged between surfaces orthogonal to an axis line of the rotating disk, one surface including the surface of the rotating disk, and another surface orthogonal to the axis line of the rotating disk and including the end of the reduction gear transmission on the side opposite to the rotating disk.

4. The rotation output device according to claim 1, wherein the input shaft of the reduction gear transmission is arranged coaxially with the columnar bar at an outer side of the columnar bar.

5. The rotation output device according to claim 1, wherein the input shaft of the reduction gear transmission is arranged parallel to the columnar bar and at a distance from the axis line of the columnar bar.

* * * * *